(12) United States Patent
Sayman

(10) Patent No.: US 6,246,941 B1
(45) Date of Patent: Jun. 12, 2001

(54) METHOD OF SYNCHRONIZING ENGINE TORQUE WITH VEHICLE TORQUE LOAD FOR ACCOMPLISHING VEHICLE TRANSMISSION SHIFTING

(75) Inventor: Robert Anthony Sayman, Laurinburg, NC (US)

(73) Assignee: ZF Meritor, LLC, Maxton, NC (US)

( * ) Notice: Subject to any disclaimer, the term of this patent is extended or adjusted under 35 U.S.C. 154(b) by 0 days.

(21) Appl. No.: 09/275,832

(22) Filed: Mar. 25, 1999

(51) Int. Cl.[7] ............................................. G06F 7/00
(52) U.S. Cl. ........................ 701/51; 701/54; 701/65; 477/109
(58) Field of Search ................... 701/51, 53, 55, 701/54, 58, 64, 65; 477/107, 109, 110, 111, 124; 74/335, 337, 339

(56) References Cited

U.S. PATENT DOCUMENTS

| | | | |
|---|---|---|---|
| 5,573,477 | 11/1996 | Desautels et al. | 477/109 |
| 5,904,068 * | 5/1999 | Genise | 74/335 |
| 5,904,635 * | 5/1999 | Genise et al. | 477/111 |
| 5,980,424 * | 11/1999 | Huber et al. | 477/109 |
| 6,015,366 * | 1/2000 | Markyvech et al. | 477/109 |

* cited by examiner

Primary Examiner—William A. Cuchlinski, Jr.
Assistant Examiner—Edward Pipala
(74) Attorney, Agent, or Firm—Carlson, Gaskey & Olds

(57) ABSTRACT

A method of engaging and disengaging transmission gears in a vehicle is provided. An intent switch is actuated for preparing the transmission to engage or disengage the transmission gears. An engine speed synchronization (ESS) controller processes an input torque parameter representing torque from an engine and an output torque parameter representing torque at a transmission output shaft. The input torque parameter may include such inputs as friction torque while the output torque parameter may include such inputs as vehicle torque load. The input torque parameter is adjusted to approximate the output torque parameter for achieving a zero torque load between the engine and transmission output shaft to facilitate engaging and disengaging transmission gears.

17 Claims, 3 Drawing Sheets

METHOD OF SYNCHRONIZING ENGINE TORQUE WITH VEHICLE TORQUE LOAD FOR ACCOMPLISHING VEHICLE TRANSMISSION SHIFTING

BACKGROUND OF THE INVENTION

This invention relates to an engine control that breaks the torque lock typically found in a transmission with engaged gears, allowing the transmission to be moved to neutral without actuating the clutch.

Heavy vehicles, such as trucks have an engine driving the wheels of a vehicle through a multi-speed transmission. The transmission is moveable through several speed ratios at the control of a manual input switch.

A manual transmission typically slides a clutch collar relative to different gears to engage one of the gears. To complete a shift, the operator must first typically move the gear that is presently-engaged out of engagement to a "neutral" position. In some transmissions, the movement out of engagement is performed by a hydraulic piston. In the "neutral" position, the transmission does not engage any gear, and thus rotational drive is not transmitted to the transmission output shaft from the engine crank shaft.

This movement from an engaged position to a neutral position occurs while drive force from the engine is being transmitted. When the transmission is engaged and rotational drive is being transmitted from the engine to the transmission, there is a large torque load holding the gears and the clutch collar together at a particular axial position. This torque load makes it quite difficult for an operator, or the piston, to move the clutch collar out of engagement. This so-called "torque lock" typically makes it impossible to move a transmission to neutral without somehow reducing the torque load. To this end, vehicles with manual transmissions have historically been equipped with clutches. An operator actuates the clutch which breaks the coupling between the engine and the transmission. The torque load goes to zero, and the operator is able to move the gear out of engagement.

In the heavy vehicle industry, the operation historically necessary to complete a shift between gears is relatively complicated. Typically, a driver must actuate the clutch, and then begin modifying the engine speed through the accelerator to synchronize engine speed to a speed necessary for the next speed ratio to be engaged. At the same time, the operator must manually move the gear shift lever to engage the gear in the proper new gear. These procedures become more burdensome when a driver is rapidly shifting through several sequential gear changes.

Control devices have been developed which calculate the transmission output torque and the engine input torque and then adjust the engine input torque until it matches the transmission output torque. When the torques match, the torque load is zero and a shift may be made without clutching or manipulating the accelerator or brakes for a "clutchless" shift.

The calculations that the control device has typically processed to achieve this result have been rather complex, requiring the use of many inputs and processing space. Also the control devices sometimes cannot be integrated into the main engine controller, and as a result, the number of inputs available and the processor size is reduced. To this end, it is desirable to provide a more simplified calculation while maintaining or improving upon the accuracy produced by prior control devices.

SUMMARY OF THE INVENTION AND ADVANTAGES

The present invention provides a method of engaging and disengaging transmission gears in a vehicle. An intent switch is actuated for preparing the transmission to engage or disengage the transmission gears. A controller processes an input torque parameter representing torque from an engine and an output torque parameter representing torque at a transmission output shaft. The input torque parameter may include such inputs as friction torque while the output torque parameter may include such inputs as vehicle torque load. The input torque parameter is adjusted to approximate the output torque parameter for achieving a zero torque load between the engine and transmission output shaft to facilitate engaging and disengaging transmission gears.

Accordingly, the above method provides a simplified but accurate manner by which to obtain a zero torque load at the interface between the engine and transmission so that transmission shift may be effectuated without manipulating the accelerator, clutch, or brakes.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1A:
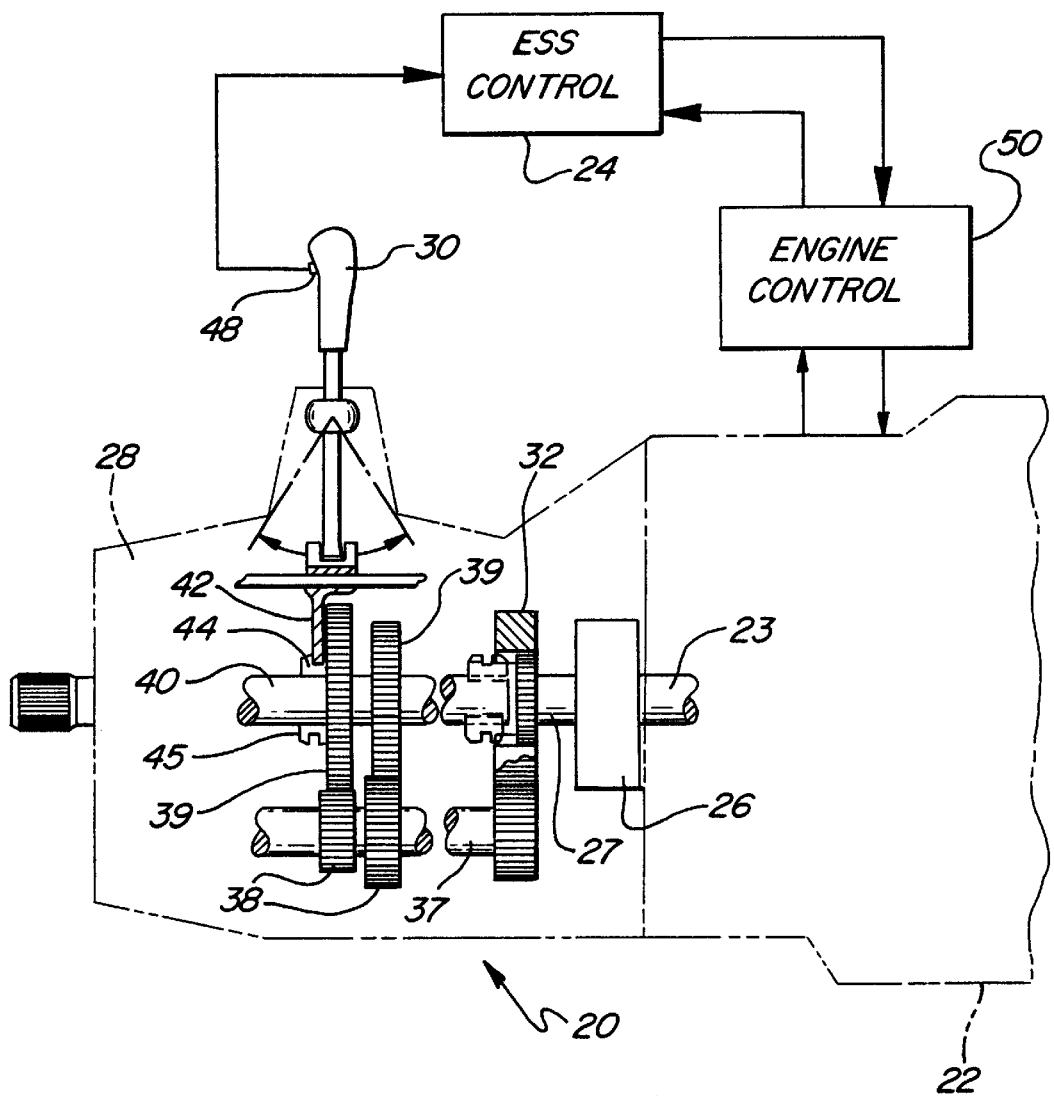
FIG. 1A is a schematic view of a drive system for a vehicle including a transmission.
Figure 1B:
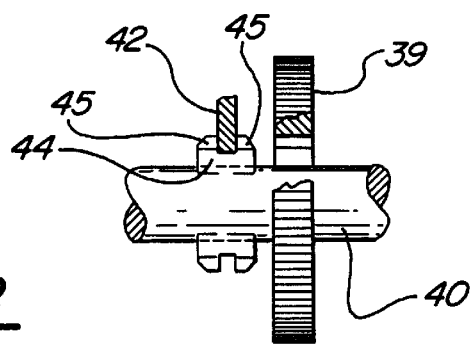
FIG. 1B shows a transmission of the system in FIG. 1A in neutral.

A drive train for a vehicle is illustrated generally at 20 in FIG. 1A. An engine 22 includes an electronic control unit 24 which controls the output speed of the engine. Control 24 will typically control the amount of fuel delivered to the engine to regulate the output speed and torque. Engine 22 has an output shaft 23 that passes through a clutch 26 to drive a multi-speed transmission 28. The transmission 28 may be of any type known in the art.

A manual stick shift 30 is operable to shift the transmission 28 between any one of several speed ratios. Transmission 28 includes a gear 32 which is driven by the output of the engine 22 when the clutch 26 is closed to a transmission input shaft 27. Gear 32 is coupled to an input shaft 27 which engages and drives a pair of gears 36 each mounted on a countershaft 37. Only one gear 36 and countershaft 37 are shown. While a transmission is shown wherein one must move the stick shift, the invention does extend to manual transmissions wherein a piston and cylinder drive the gears after the operator requests a shift.

Countershaft 37 rotates several gears 38, only two of which are shown. Gears 38 engage and rotate a plurality of gears 39 that are mounted to freely rotate on a main output shaft 40. A shift yoke 42 slides a shift collar 44 as directed by the vehicle operator to change the speed ratio of the transmission 28. In the illustrated transmission, collar 44 is internally splined to rotate with shaft 40, but may slide axially along shaft 40. Collar 44 also has external teeth 45 that are selectively received within an inner peripheral bore on a gear 39. When the shift collar 44 is in the position shown in FIG. 1A, the teeth 45 engage the gear 39 such that the gear 39 rotates the collar 44, and hence the shaft 40.

Thus, in the position shown in FIG. 1A, the engine drives the gear 32, which drives gears 36 and counter-shafts 37. The counter-shafts 37 drive the gears 38, which drive the gears 39.

Since the collar 44 is engaged to rotate with one gear 39, then the shaft 40 will be rotated at a speed which is dependent on the gear reduction at the selected gear 39. When one wishes to shift the transmission to another speed, another gear 39 is selected and engaged. By varying the gear reductions between the several gears 39, transmission 28 is able to selectively achieve several distinct output speed ratios for shaft 40 relative to input from engine 22.

In moving the collar 44 to shift to another speed ratio, the initial step is to move the teeth 45 out of engagement from the inner peripheral bore of the gear 39. When the drive train 20 is transmitting rotation to the shaft 40 through the arrangement as shown in FIG. 1A, however, there is a high torque load on the connection between the teeth 45 and the gear 39 and between collar 44 and shaft 40. This high torque load makes it difficult, if not impossible, to slide the collar 44 relative to the gear 39. For this reason, vehicles have traditionally incorporated a clutch 26. An operator who wishes to shift a transmission to a new speed, initially actuates the clutch. This breaks the torque transmission discussed above, and allows the operator to disengage the transmission and move to neutral.

As discussed above, the prior art allows an operator to shift the transmission to a new speed without operating the clutch. To achieve the ability to shift the gear without clutching a switch 48 is incorporated on the shift knob 30. This switch 48 is utilized to request torque elimination or to eliminate the torque lock preventing sliding movement of the collar 44 from the position shown in FIG. 1A. The collar 44 may be actuated by either the driver manipulating the shift knob or by a automatic shifting system utilizing hydraulic or pneumatic shifting mechanisms.

The present invention utilizes an engine speed synchronization (ESS) controller 50 to interconnect the switch 48 to the engine controller 24. When an operator actuates switch 48, a signal is sent to ESS controller 50 requesting a zero torque load on the connection between the engine 22 and transmission 28. The ESS controller 50 obtains the input and output torques of the transmission and adjusts the input torque to match the output torque.

More specifically, the transmission input torque represents the engine output torque and is received from the engine controller 24. The transmission output torque is a calculated value representing vehicle torque load that is based upon the calculations and assumption explained in more detail below.

As mentioned above, the present invention improves upon the prior art by utilizing the vehicle torque load and comparing the vehicle torque load to the friction torque from the engine. The friction torque is then changed until it closely approximates the vehicle torque and the torque at the engine/transmission interface equals zero. Vehicle torque load has not been used in the prior art to predict zero torque load for "clutchless" shifting. Utilizing vehicle torque load provides an effective and simplified means for accurately predicting zero torque. The above relationship may be represented by the following equation:

ZeroTorque=FrictionTorque+VehicleTorqueLoad+DitherTorque(optional).

The friction torque is the torque produced by the engine 22 and transmitted to the transmission 28 through clutch 26 at the transmission input shaft 27. The friction torque is received by the ESS controller 50 from the engine controller 24 as an already processed value and is in not adjusted unless the parameter becomes stale or limits are exceeded. The friction torque value received takes parasitic losses into account and should accurately reflect the friction torque required to maintain the engine at a constant speed at the current RPM and with no torque produced at the transmission input. As mentioned above, the friction torque represents the torque being applied to the input shaft 27 of the transmission 28.

Vehicle torque load is the torque applied at the transmission output shaft 40. As stated earlier, it is the differential in torque between the transmission input 27 and output 40 shafts that creates torque lock. The vehicle torque load is highly dependent on the speed of the vehicle. However, it may be more desirable instead to use the overall gear ratio since the vehicle speed includes undesirable noise that is preferably filtered out. Overall gear ratio corresponds roughly with the vehicle speed. Using either vehicle speed or overall gear ratio, the vehicle torque load may be represented the equation VehicleTorqueLoad=a+bx+cx$^2$, where x is either vehicle speed or overall gear ratio. Drag force, or the cx$^2$ term, is the most dominant portion of the equation, while the bx term corresponds to the less dominant inertial forces and the a term corresponds to the even less dominant drive forces. Vehicle torque load may also be represented by summing the torques being exerted on either side of the transmission at the input and output shafts, which is as follows:

VehicleForceLoad=(DriveForce−InertialForce−DragForce).

Vehicle force load can then be converted to vehicle torque load.

Drive forces include engine torque produced by the engine to propel the vehicle. Inertial forces include all the drive train inertias, such as engine, transmission, drive line, axle, and wheel inertias. Drag forces include the force produced by the vehicle's acceleration, aerodynamic drag, rolling resistance, and grade resistance and equation. These force loads may be represented by the equation $$VehicleForceLoad = \frac{\left(\begin{array}{c} ActualEngineTorque \times OverallGearRatio^2 \times \\ DrivetrainEfficiency \end{array}\right)}{WheelRadius} - \frac{\left[\begin{array}{c}(I_{eng}+I_{trans}) \times OverallGearRatio^2 + \\ I_{drive} \times AxleRatio^2 + I_{wheels}\end{array}\right] \times a}{WheelRadius^2} - F_{aero} - F_{rr} - F_{grade},$$

-continued where:

$I_{eng}$ = Engine mass moment of inertia $I_{trans}$ = Transmission mass moment of inertia $I_{drive}$ = Driveline/Axle mass moment of inertia $F_{aero}$ = Aerodynamic Drag $F_{rr}$ = Rolling Resistance.

$a$ = Vehicle Acceleration $F_{grade}$ = Grade Resistance

Figure 2:
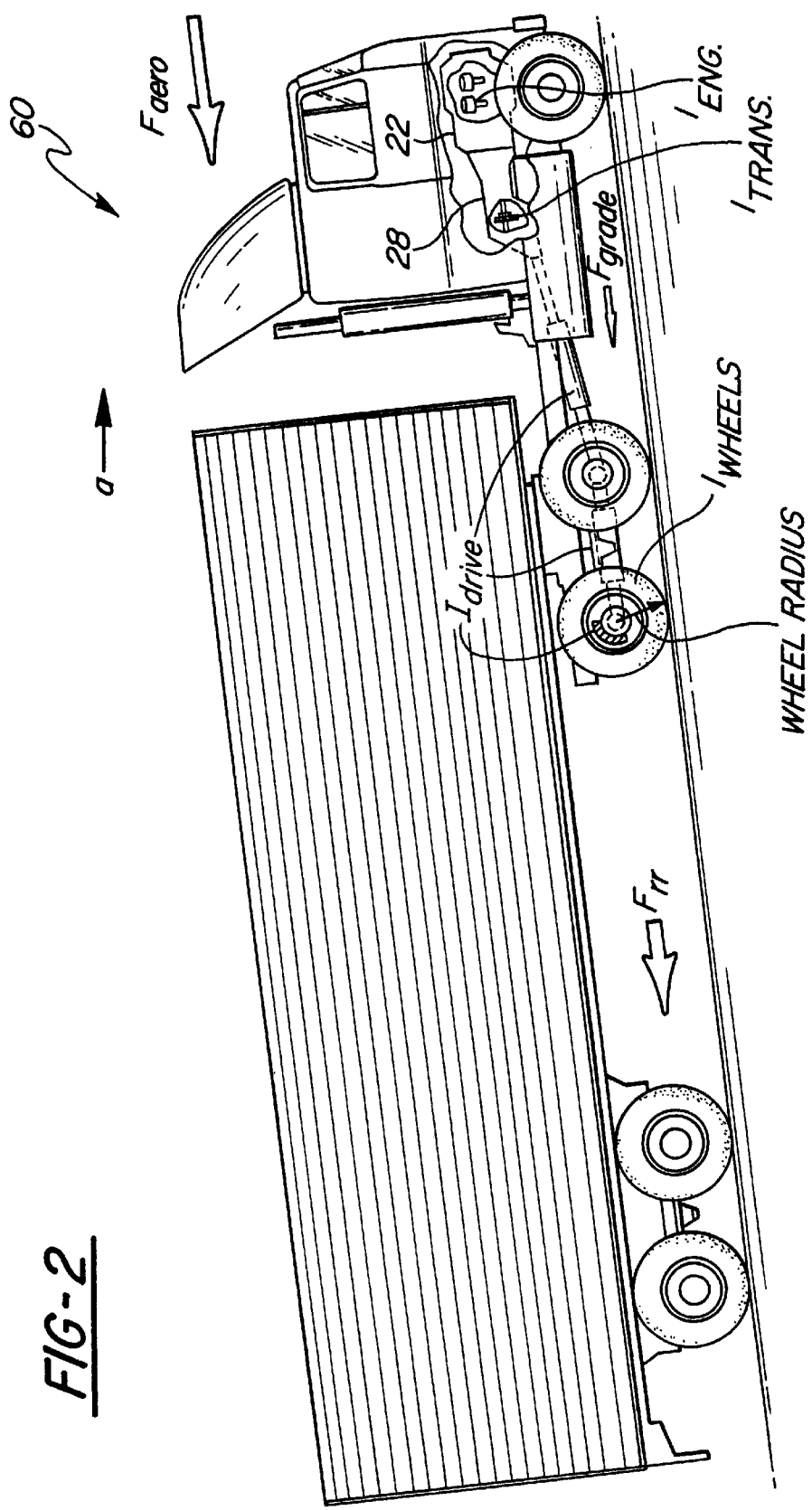
FIG. 2 is a schematic view of the drive system in FIG. 1A in a vehicle.

The present invention may also be better understood by reference to FIG. 2 with the above variable indicated therein. A vehicle 60 is shown at 60 travelling up a slight incline. As can be appreciated by the above equations and FIG. 2, the engine must overcome all the inertial and drag forces to propel the vehicle. During operation of the vehicle, the variables that make up these forces are constantly changing and can be very difficult to determine accurately. Knowing the value of these variables is necessary so that the engine force may be adjusted to equal the actual inertial and drag forces the vehicle is experiencing in a given situation. Once engine force equals the inertial and drag forces combined, zero torque is achieved and the driver may effectuate a "clutchless" gear shift.

Calculating zero torque requires that many different variables be input into the processor and that processor size be sufficient to make the necessary calculations. Moreover, as previously mentioned, the values of many of the variables are difficult to obtain. The present invention uses certain assumptions to simplify the calculation while maintaining an acceptable degree of accuracy. Since the intent switch takes throttle control away from the driver thereby preventing any further acceleration of the vehicle, it may be assumed that the acceleration of the vehicle is zero and that the vehicle is coasting. This assumption simplifies the calculations required by the ESS controller by reducing the amount of information needed to accurately predict vehicle torque because the drive forces and inertial forces drop out of the above equation yielding:

$$VehicleTorqueLoad = -\frac{(F_{aero} + F_{rr} + F_{grade}) \times WheelRadius}{OverallGearRatio^2}.$$

As mentioned above, the vehicle speed may be used instead of the overall gear ratio, but overall gear ratio is preferred.

Figure 3:
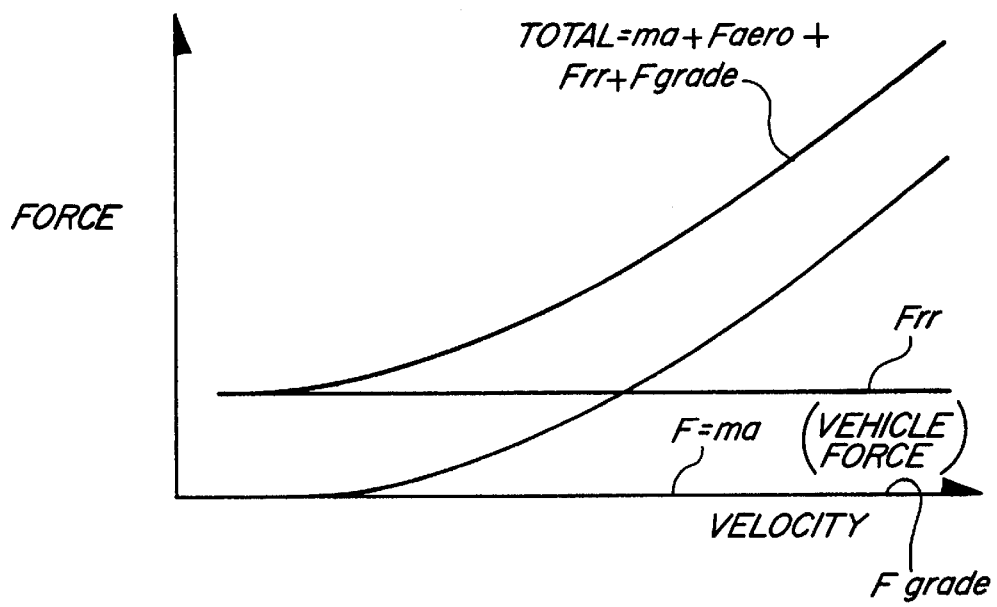
FIG. 3 is a graph of the vehicle forces during a shift.

Referring now to FIG. 3, a graph of the vehicle velocity versus vehicle force is shown assuming zero acceleration on a level surface. Under these conditions the grade resistance and vehicle acceleration forces are zero. As seen by the graph, the aerodynamic resistance is the dominant force since it is highly dependent on vehicle velocity. Aerodynamic resistance data is determined for each vehicle in a testing facility and is embodied in a first table of vehicle test data for use by the ESS controller. Although assumed to be zero in the graph, grade resistance may be obtained from a second table of data which makes estimates based upon several factors such as throttle position and velocity. For example, if the engine is at wide open throttle and the increase in velocity is negligible then it is likely that the vehicle is traveling up an incline. Rolling resistance may be obtained from a third table of data which makes estimates based upon vehicle weight and the number of wheels bearing the vehicle's weight. As seen in FIG. 2, rolling resistance is generally constant.

For all the variables which are not derived from real time vehicle condition or information from tables of test data, an estimate is made to closely approximate the actual vehicle condition while minimizing the amount of dithering to achieve zero torque.

Figure 4:
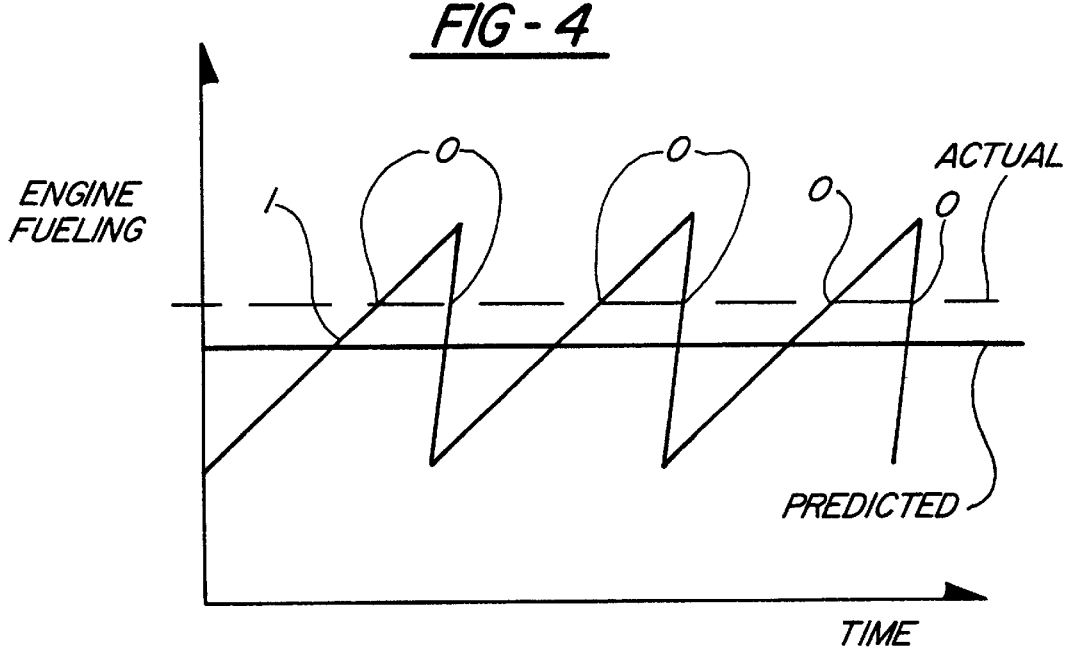
FIG. 4 is a graph of the torque elimination feature of the present invention.

Referring to FIG. 4, the dither factor incorporates a variation of the input or engine torque above and below the predicted value of the vehicle torque load as discussed above.

Preferably, the dither value varies a small percentage of the predicted value both below and above the predicted value. Most preferably, the dither is incorporated into the engine fueling in a saw tooth fashion, such that the engine speed begins on one side of the predicted value, moving up from the greatest amount of dither to cross the predicted engine speed, and then continues on a single slope to the other extreme. The engine fueling then returns to the initial point such that the profile of the engine fueling has a ramp on a front end and then a direct downward component on the other end as shown in FIG. 4. In this way, the profile will cross the actual zero torque value more frequently.

Preferably, the dither factor is only utilized when one gets close to the predicted value. As one alternative, a "blip" may be utilized immediately after receipt of the request for torque elimination. The blip would increase the torque load momentarily, then drop the torque load down to include the dither value and the transition towards the predicted zero torque value. This blip would assist in moving the system to a condition such that the zero torque value would not require a negative fueling. A negative fueling is of course not possible, and thus by utilizing the blip, the possibility of a negative fueling requirement may be eliminated.

Thus, an operator requests the torque elimination feature through button 48. The ESS controller 50 makes the calculations based on the input and output parameters discussed above and instructs the engine controller 24 to vary the engine fueling as shown in FIG. 4. The operator applies force to the manual stick shift 30, attempting to move the collar 14 and disengage the gear. As the actual engine fueling saw tooth profile crosses the actual zero torque value, the operator will be able to disengage the collar. A signal is then sent to the controller 24 that the transmission is in neutral. Once a signal is received that the transmission is in neutral, control is either returned to the operator or an engine synchronization system as described generally in this application is then actuated to synchronize the speed to that which will be necessary at the next expected gear.

Modern engine controls can achieve the above-described control parameters very quickly. All of the above calculations and speed modifications can be performed in a fraction of a second. Further, because of the simplified calculation and fewer variables utilized by the present invention, the data may be processed more quickly using less processor space. Known transition rate algorithms are used to achieve the desired values of engine speed.

The invention has been described in an illustrative manner, and it is to be understood that the terminology which has been used is intended to be in the nature of words of description rather than of limitation. Obviously, many modifications and variations of the present invention are possible in light of the above teachings. For example, more variables may be added back into the simplified vehicle torque load equation of the present invention to achieve more accuracy. Also, certain vehicle parameters may be measured in real time instead of obtained from test data and visa versa. It is, therefore, to be understood that within the scope of the appended claims the invention may be practiced otherwise than as specifically described.

What is claimed is:

1. A method of engaging and disengaging transmission gears in a vehicle comprising the steps of:
    (a) actuating an intent switch for preparing the transmission to engage or disengage the transmission gears;
    (b) processing an input torque parameter representing torque from an engine;
    (c) processing an output torque parameter representing torque at a transmission output shaft; and
    (d) adjusting the input torque parameter to approximate the output torque parameter for achieving a zero torque load between the engine and transmission output shaft to facilitate engaging and disengaging transmission gears.

2. The method as set forth in claim 1 wherein step (c) further comprises the steps of:
    (c)(1) obtaining an engine drive force parameter;
    (c)(2) obtaining a drive line inertial force parameter and subtracting the drive line inertial force parameter from the engine drive force parameter; and
    (c)(3) obtaining a vehicle drag force parameter and subtracting a vehicle drag force parameter from the engine drive force parameter.

3. The method as set forth in claim 2 wherein step (c)(3) further comprises the steps of:
    (c)(3)(A) obtaining an aerodynamic resistance parameter;
    (c)(3)(B) obtaining a grade resistance parameter and adding the grade resistance parameter to the aerodynamic resistance parameter; and
    (c)(3)(C) obtaining a rolling resistance parameter and adding the rolling resistance parameter to the aerodynamic resistance parameter.

4. The method as set forth in claim 3 wherein step (d) comprises dithering the input torque parameter about the output torque parameter by varying engine fueling.

5. The method as set forth in claim 3 wherein the aerodynamic resistance parameter is obtained from a first table of vehicle test data.

6. The method as set forth in claim 3 wherein the grade resistance parameter is obtained from a second table of vehicle test data.

7. The method as set forth in claim 6 wherein the grade resistance parameter is modified in relation to vehicle speed and engine throttle position.

8. The method as set forth in claim 3 wherein the rolling resistance parameter is obtained from a third table of vehicle test data derived from an estimate of number of wheels and vehicle weight.

9. The method as set forth in claim 2 wherein acceleration of the vehicle is assumed to be zero after actuating the intent switch for negating the engine drive force parameter and negating the drive line inertial force parameter.

10. The method as set forth in claim 1 wherein step (b) comprises obtaining a friction torque parameter sent from an engine control processor.

11. The method as set forth in claim 2 wherein the drive line inertial force parameter and vehicle drag force parameters are obtained as a function of overall gear ratio.

12. The method as set forth in claim 2 wherein the drive line inertial force parameter and vehicle drag force parameters are obtained as a function of vehicle speed.

13. The method as set forth in claim 1 wherein steps (b) and (c) occur simultaneously.

14. A vehicle drive system comprising:
    an engine having an engine output shaft;
    a transmission having a transmission input shaft coupled to said engine output shaft and a transmission output shaft selectively coupled to said transmission input shaft by a plurality of gears;
    an intent switch for preparing to shift said transmission between said plurality of gears when said intent switch is actuated;
    an engine control having an engine torque signal representing a torque at said engine output shaft; and
    an engine synchronization control connected to said engine control for calculating a torque at said transmission output shaft and adjusting said torque at said engine output shaft until said torque at said engine output shaft approximates said torque at said transmission output shaft so that a zero net torque is achieved and a shift between said plurality of gears may be effected when said intent switch is actuated.

15. The vehicle drive system as set forth in claim 14 wherein said torque at said transmission output shaft represents a vehicle torque load, said engine synchronization control calculating said vehicle torque load using a drive force parameter, an inertial force parameter, and a drag force parameter.

16. The vehicle drive system as set forth in claim 15 wherein said inertial force is assumed to be zero and said drag force parameter includes an aerodynamic resistance parameter, a grade resistance parameter, and a rolling resistance parameter and said engine synchronization control adjusts said torque at said engine output shaft to approximate the sum of said aerodynamic resistance, said grade resistance, and said rolling resistance parameters.

17. The vehicle drive system as set forth in claim 15 wherein said engine control and said engine synchronization control are one control unit.

* * * * *